United States Patent
Levy et al.

(10) Patent No.: US 10,091,625 B2
(45) Date of Patent: Oct. 2, 2018

(54) SYSTEMS AND METHODS FOR ESTABLISHING A PERSONAL BASIC SERVICE SET (PBSS) OVER A WIRELESS NETWORK TO FACILITATE PEER-TO-PEER GROUP COMMUNICATION

(71) Applicants: Elad Levy, Nes Ziona (IL); Solomon Trainin, Haifa (IL); Michael Glik, Kfar Saba (IL)

(72) Inventors: Elad Levy, Nes Ziona (IL); Solomon Trainin, Haifa (IL); Michael Glik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 14/496,903

(22) Filed: Sep. 25, 2014

(65) Prior Publication Data
US 2016/0094957 A1   Mar. 31, 2016

(51) Int. Cl.
*H04W 4/08* (2009.01)
*H04W 76/14* (2018.01)
*H04L 29/08* (2006.01)

(52) U.S. Cl.
CPC ............. *H04W 4/08* (2013.01); *H04L 67/104* (2013.01); *H04L 67/1046* (2013.01); *H04L 67/1068* (2013.01); *H04W 76/11* (2018.02); *H04W 76/14* (2018.02); *Y02D 70/00* (2018.01); *Y02D 70/142* (2018.01); *Y02D 70/144* (2018.01);
(Continued)

(58) Field of Classification Search
CPC ....... H04W 4/08; H04W 16/28; H04W 76/00; H04W 76/04; H04W 76/043; H04W 76/021; H04W 76/023; H04L 67/104; H04B 7/0617
See application file for complete search history.

(56) References Cited

U.S. PATENT DOCUMENTS

| 6,983,167 B2 * | 1/2006 | Adachi | ................. H01Q 1/246 370/322 |
| 2010/0157955 A1 * | 6/2010 | Liu | ................... H04W 72/0446 370/336 |

(Continued)

OTHER PUBLICATIONS

International Search Report and Written Opinion received for PCT Patent Application No. PCT/US2013/072329, dated Aug. 2014, 2014, 6 Pages.

*Primary Examiner* — Dong-Chang Shiue
(74) *Attorney, Agent, or Firm* — Eversheds Sutherland (US) LLP

(57) ABSTRACT

Certain embodiments herein relate to establishing a personal basic service set (PBSS) before negotiating formation of a peer-to-peer group. A device may discover candidate devices on a wireless network (e.g., operating in the sixty (60) Gigahertz (GHz) range), and may select a target device among the candidate devices with which to engage for establishing the PBSS and forming the peer-to-peer group. A time limit may be implemented for forming the peer-to-peer group, after which time the device or the target device may disengage and discover other devices with which they may engage to form a peer-to-peer group using a PBSS. Devices may conserve power during communication of peer-to-peer messages by virtue of using a PBSS to facilitate the peer-to-peer group formation, among other benefits.

23 Claims, 7 Drawing Sheets

(52) U.S. Cl.
CPC .......... *Y02D 70/162* (2018.01); *Y02D 70/166* (2018.01); *Y02D 70/22* (2018.01)

(56) References Cited

U.S. PATENT DOCUMENTS

2014/0078928 A1* 3/2014 Verma .................... H04W 84/20
370/254
2015/0373618 A1* 12/2015 Deenoo ................. H04W 8/005
455/502

* cited by examiner

SYSTEMS AND METHODS FOR ESTABLISHING A PERSONAL BASIC SERVICE SET (PBSS) OVER A WIRELESS NETWORK TO FACILITATE PEER-TO-PEER GROUP COMMUNICATION

BACKGROUND

Wireless devices may establish groups in which they provide or obtain various services from other devices in the group. The devices may utilize existing wireless standards to discover other devices and ultimately form such groups. Formation of the groups, however, may be challenging in large part due to the long time that it often takes to form the groups. Maintaining reliable communication links during the formation may be particularly difficult given the amount of time required to form the group. Various interferences, user input delays, movement of devices, etc., are example circumstances that may extend delays and therefore hinder group formation, particularly in multi-Gigabit per second (Gbps) networks operating in the 60 GHz frequency band.

Existing wireless standards and techniques aimed at increasing the reliability of group formation have been largely unsuccessful for various reasons. For example, existing standards and techniques have not employed a mechanism for signaling the transition from discovery mode to negotiating group formation (which may include establishment of a personal basic service set (PBSS)) to the devices desiring to form a group. In particular examples, the time at which devices will begin establishing a PBSS with relation to completing the discovery process and forming a group is unknown to the devices, thereby encumbering reliable group formation.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Certain embodiments herein relate to, among other things, establishing a personal basic service set (PBSS) to facilitate formation of a peer-to-peer group. A wireless station or device may form a group with another wireless device. Each device may perform a different role within the group to support other devices within the group. For example, a mobile device may form a group with a tablet device, which may provide the mobile device with web-based content received from a web server. Such communication may occur via the peer-to-peer protocol, and may be referred to herein as a peer-to-peer group. In certain embodiments herein, formation of the peer-to-peer group may be facilitated by establishing a PBSS before peer-to-peer communication directed to forming the peer-to-peer group begins. By virtue of using a PBSS, peer-to-peer messages may be scheduled according to a beacon time interval, among other benefits, to enable reliable communication for forming the peer-to-peer group.

A device may discover other devices within range and determine a target device for establishing a PBSS. After determining the target device, the device may signal to the target device a desire to engage with the target device to establish a PBSS and form a peer-to-peer group that includes the device and the target device. The signaling may include sending, in a direction of the target device based on association beamforming training (ABFT) information, a discovery beacon that includes a Media Access Control (MAC) address of the target device in the ABFT responder field of the discovery beacon. The device and the target device may thereafter exchange probe requests and responses that may include information, such as capabilities information and device parameters, about the devices. A PBSS control point (PCP) may be determined based on the exchanged probes. The PCP may establish the PBSS, and the target device may associate with or join the PBSS to begin forming the peer-to-peer group.

The example communication above may occur in millimeter wave systems in which directional communication may be required. For example, the stations or devices described herein may operate at frequencies in the sixty (60) Gigahertz (GHz) range, but may also operate at other frequency ranges in which directional communication may be utilized.

The above descriptions are for purposes of illustration and are not meant to be limiting. More detailed descriptions and examples associated with establishing a PBSS over a wireless network to facilitate peer-to-peer group communication (e.g., formation of a peer-to-peer group) are provided below.

Figure 1:
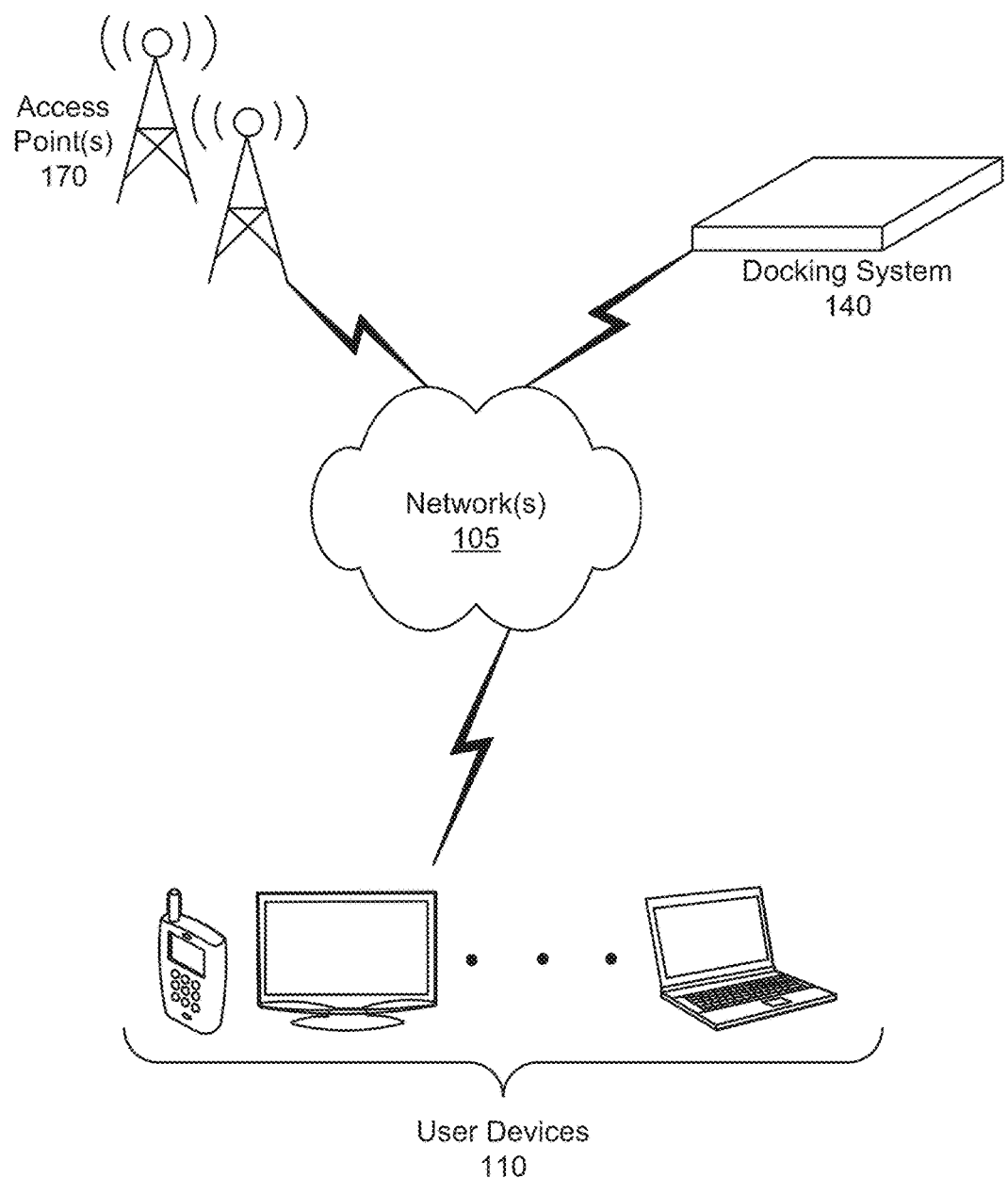
FIG. 1 illustrates a schematic diagram of an environment in which wireless devices may communicate with one another using the techniques described herein, according to an embodiment of the disclosure.

FIG. 1 depicts a schematic diagram of an environment in which wireless devices may communicate with one another using the techniques described herein. For example, one or more user devices 110, access points 170, and other devices such as a docking system 140, may communicate with one another over one or more networks 105. In certain embodiments herein, a network 105 may be a WiFi network that supports multi-gigabit per second communication speeds, such as that defined by the Wireless Gigabit Alliance (WiGig). According to WiGig and the 802.11ad protocol, the devices 110, 140, and 170 may utilize the 60 GHz frequency band for communication, such as via directional medium access and beamforming protocols.

In an example configuration, an access point 170 may route messages between user devices 110. For example, the access point 170 may receive a message from a first user device 110 and send the message to a second user device 110. In this way, multiple user devices 110 may communicate with each other through one or more access points 170. Such communication may be facilitated by a basic service set (BSS) architecture according to one implementation.

In certain embodiments herein, a personal basic service set (PBSS) architecture as defined in 802.11ad may be used to enable ad hoc communication, such as peer-to-peer (P2P) communication, between the user devices 110. According to such communication, the user devices 110 may not rely on the access point 170 to communicate with one another but may communicate directly with one another. By way of a PBSS, any one of the user devices 110 may be designated as a PBSS control point (PCP) and may be designated to transmit beacons to other devices, and/or perform various other control functions, in accordance with the 802.11ad standard in one implementation. In this way, devices in communication with the PCP may rely on the PCP for sending certain communications.

Certain implementations herein also relate to user devices 110 communicating with one another to form a peer-to-peer group and subsequently determining a group owner (GO) of the peer-to-peer group, where the group owner may perform the same or similar functions as the PCP in the PBSS architecture described above. Peer-to-peer communication as described herein may be performed in multi-Gigabit per second (Gbps) networks (e.g., in the 60 GHz frequency band) according to the WiFi Alliance (WFA) specification, in one implementation. Example peer-to-peer communication may include message exchanges associated with negotiating peer-to-peer group formation, the group owner role, and other functions or responsibilities. The message exchanges may be implemented via PD messages, GON messages, Invitation messages, etc. The peer-to-peer communication may utilize the 802.11ad standard to send and receive capabilities information, device parameters, or various other information between the user devices 110.

Figure 2:
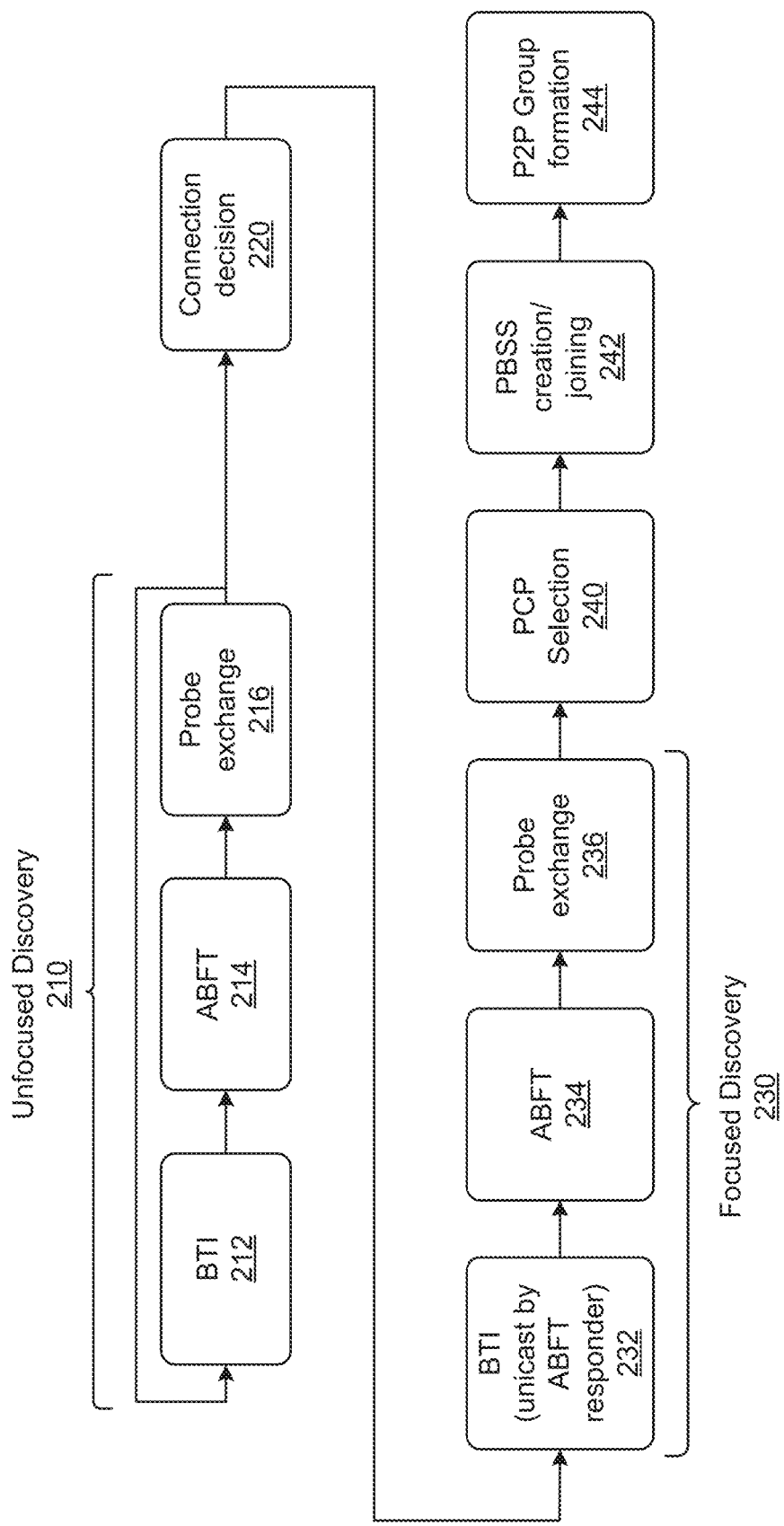
FIG. 2 illustrates a block diagram of an example process for establishing a personal basic service set (PBSS) over a wireless network to facilitate peer-to-peer communication (P2P), according to an embodiment of the disclosure.

Example communication between the devices in FIG. 1 may occur as illustrated in FIG. 2, in one embodiment. Example communication may be as follows. A user device 110, such as a mobile device, may initiate unfocused discovery 210, which may relate to discovering the identity and capabilities of other devices within range of the mobile device. Such discovery may involve the mobile device transmitting a beacon in various directions according to a beacon transmission interval (BTI) 212, which may be a recurring time interval, such as 100.0 milliseconds (ms), 200.0 milliseconds, etc. Such beacon transmissions may be performed in association with active scanning as defined by 802.11ad, in one implementation.

The mobile device may receive responses to its beacon transmissions. In one embodiment, the responses may be association beamforming training (ABFT) responses 214, and may be received using ABFT allocation. The responses may include a unique identification and a direction or location of the responding devices, among other information. The mobile device may also send a probe request that includes device parameters, capabilities information, etc., about the mobile device to the responding devices in the directions determined from the ABFT responses 214. The responding devices may send a probe response that may include information about the capabilities of the responding devices. Such an exchange of probe requests and probe responses are illustrated as probe exchange 216.

The mobile device may perform a connection decision 220 after receiving the probe responses, in one embodiment. The connection decision 220 may be performed by a user selecting a certain user device identified during the unfocused discovery 210 with which engagement is desired, or by the mobile device automatically selecting a certain user device based on a profile or other predetermined setting or information. Such engagement may be desired for the purpose of establishing a PBSS and forming a peer-to-peer group in which the mobile device and a responding device may associate.

According to one example, the mobile device may select a docking system, such as the docking system 140 in FIG. 1. The docking system may be configured to provide various services to the mobile device, such as receiving information from a web server or other remote device and outputting the information on a display, providing access to peripheral devices (e.g., a printer, a display, speakers, etc.). As will be described in greater detail below, one of the mobile device or the docking system may become a PCP and/or subsequently a group owner of a peer-to-peer group.

The mobile device may initiate focused discovery 230, which may include the mobile device discovering additional information about the docking system, and vice versa. The focused discovery 230 may include the mobile device sending a discovery beacon at a beacon transmission interval (BTI) 232. The beacon transmission may trigger or signal to the docking system that the mobile device desires to establish a PBSS with the docking system. In one embodiment, such signaling may be performed by the mobile device indicating a Media Access Control (MAC) address, or other unique identifier, of the docking system in the ABFT responder field of the discovery beacon.

The beacon transmission sent by the mobile device at the BTI 232 may also include a time limit for establishing the PBSS or forming a peer-to-peer group. If either or both of these processes are not completed by the time limit, then the mobile device and the docking system may discontinue attempts to complete such processes and may discover and engage other devices instead.

The docking system may beamform in a direction of the mobile device. Such a direction may be determined from the discovery beacon received from the mobile device. The docking system may respond to the received discovery beacon with an ABFT response 234, in one embodiment. The ABFT response 234 may include an acknowledgement that the beacon transmission was received at the BTI 232 and that the docking system will engage the mobile device to establish a PBSS and form a peer-to-peer group. The ABFT response 234 may also include updated information regarding the direction or location of the docking system. If the docking system has moved, for example, the updated information may indicate a new direction of the docking system so that the mobile device will be able to beamform information to the docking system.

The mobile device may provide its updated information (e.g., capabilities, etc.) by sending a probe request to the docking system, and may receive updated information about the docking system from the docking system in a probe response. The probe request and response may be performed as part of the probe exchange 236. In one embodiment, completion of the probe exchange 236 may indicate a successful focused discovery 230.

As described above, the beacon and probe communications in the focused discovery 230 may be sent in directions of the intended device as identified during the unfocused discovery 210. Such directional communications may be performed according to beamforming techniques defined in 802.11ad, in one implementation.

The information exchanged during the probe exchange 236 may be used to perform PCP selection 240. In one embodiment, the PCP may be selected according to the 802.11ad standard based on the information in the probe exchange 236. In the present example, either the mobile device or the docking system may be selected as the PCP, and may perform corresponding functions of a PCP. In traditional examples, the PCP may be responsible for sending peer-to-peer messages (e.g., PD, GON, and Invitation messages) that may be used to form a peer-to-peer group, and may not sustain a reliable link for establishing the peer-to-peer group due to the amount of time required to establish a peer-to-peer group, among other challenges. In certain embodiments herein, the device selected as the PCP (e.g., the mobile device) may create or establish a PBSS and initiate a process 242 that may allow other devices to join the PBSS. For example, the PCP may send non-discovery beacons to the non-PCP device (e.g., the docking system), and may receive a response to the non-discovery beacons confirming joining of the docking system to the PBSS.

The PBSS establishment and joining process 242 may enable scheduling of peer-to-peer messages between devices engaged in the PBSS. By way of such scheduling, the engaged devices may receive peer-to-peer messages notwithstanding interference or other disruptive events. The peer-to-peer negotiations may be performed for a predetermined amount of time beyond which the devices engaged in the negotiation may discontinue the negotiation and attempt to form a peer-to-peer group with one or more other devices.

After the peer-to-peer group 244 is formed and group owner determined, the group owner may perform the functions of the PCP that was selected at the PCP selection 240. In certain embodiments herein, the group owner may be the same or different from the device that was selected as the PCP at the PCP selection 240. For example, the mobile device may be selected as the PCP, while the smart television may be selected as the group owner of the peer-to-peer group. In another example, the mobile device (or the docking system) may be selected as both the PCP and the group owner. The determination of which device becomes the group owner may be performed according to the peer-to-peer protocol, in one embodiment. Example processes and techniques herein may facilitate communicating messages for negotiating and establishing of the peer-to-peer group and group owner in a reliable, power-efficient manner. Such techniques and processes will be described in greater detail below.

The above descriptions in FIGS. 1 and 2 are for purposes of illustration and are not meant to be limiting. While the descriptions relate to communication between a mobile device and a docking system, any type or number of devices may perform such communication to establish a PBSS and form a peer-to-peer group and determine a group owner. For example, two mobile devices, or other types of user devices 110 in FIG. 1, may communicate with each other in such fashion.

As used herein, the term "device" may refer to any computing component that includes one or more processors that can be configured to execute computer-readable, computer-implemented, or computer-executable instructions. Example devices may include a station (e.g., a wireless station), personal computers, docking systems, server computers, server farms, digital assistants, smart phones, personal digital assistants, digital tablets, smart cards, Internet appliances, application-specific circuits, microcontrollers, minicomputers, transceivers, kiosks, other host devices, client devices, and mobile devices, or generally other processor-based devices. The execution of suitable computer-implemented instructions by one or more processors associated with various devices may form special purpose computers or other particular machines that may implement or facilitate the processes described herein.

As used herein, the term "establishing a PBSS," or similar, is not meant to be limited to creating a PBSS, such as that which may be performed by a PCP. Establishing a PBSS may also include the process in which other devices join the PBSS, for example, to negotiate forming a peer-to-peer group and determining a group owner of the peer-to-peer group.

Engaging with a device to establish a PBSS to facilitate forming a peer-to-peer group, as referred to herein, may mean that the engaged devices may be dedicated with one another for the purpose of forming the peer-to-peer group. Engaged devices may not communicate with other devices for the purpose of establishing a PBSS to facilitate forming a peer-to-peer group while such devices are engaged with one another. Engaged devices may remain engaged or dedicated for a certain amount of time (e.g., until a time limit is reached), in one embodiment.

Beamforming may refer to a signal processing technique used in sensor arrays for directional signal transmission or reception. The directional transmission and reception may be performed by combining elements in a phased array in such a way that signals at particular angles experience constructive interference while others experience destructive interference. Devices may perform association beamforming training (ABFT) with one another according to the 802.11ad standard, in one embodiment. ABFT techniques, or more generally beamforming, may include, but are not limited to, estimating the relative direction where a radio signal originates. Such techniques may also include periodically re-evaluating interference, signal strengths, etc., and refining/improving the quality of a communication link based on such an adaptive process. Various techniques for calculating the direction of arrival, such as angle of arrival (AoA), time difference of arrival (TDOA), frequency difference of arrival (FDOA), a hybrid of the above techniques, or other similar detection techniques could be utilized to determine the relative direction of a transmission source. Thus, this information may be utilized to project a directional transmission or to focus a receive antenna system.

Figure 3:
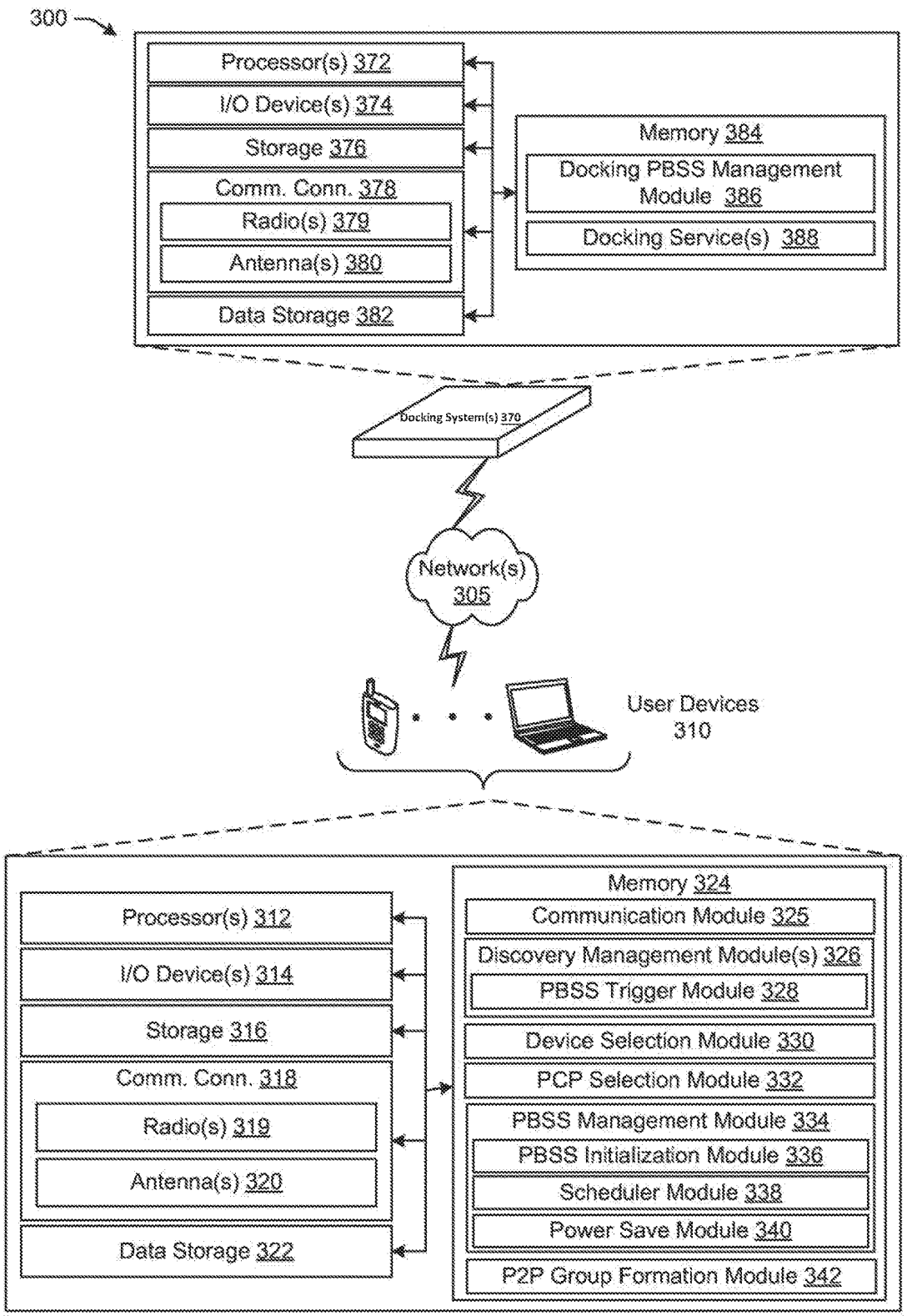
FIG. 3 illustrates a block diagram of an example computing environment for establishing a PBSS over a wireless network to facilitate P2P communication, according to an embodiment of the disclosure.

Networks described herein, such as the network 105 in FIG. 1 and the network 305 in FIG. 3, may support various wireless technologies and types of wireless networks, such as WiFi, WiFi Direct, peer-to-peer (P2P), Near Field Communication (NFC), Bluetooth®, ultra wide band (UWB), Uniform Serial Bus (USB), Zigbee, various antenna systems (e.g., single antenna, sector antennas, and multiple antenna systems (such as multiple input multiple output (MIMO) systems), cellular networks, cable networks, radio networks, satellite networks, the Internet, intranets, or any number of wireless or wired networks.

Devices described herein may include a radio receiver. A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. Devices herein may further include a radio transmitter that may send one or more RF signals to one or more access points, such as the access points 170 in FIG. 1. In some configurations, devices may include a radio transceiver that may receive and send RF signals. A transceiver (or a receiver and transmitter) may be coupled to one or more antennas associated with the devices.

Wireless networks herein may utilize the 802.11ad standard, as defined by the Institute of Electrical and Electronics Engineers (IEEE). The 802.11ad standard defines a new physical layer for 802.11 networks to operate in the 60 GHz millimeter wave spectrum. IEEE 802.11ad was published in December 2012.

FIG. 3 depicts a block diagram of an example computing environment 300 for establishing a PBSS over a wireless network to facilitate P2P communication, according to an embodiment of the disclosure. The example computing environment 300 may include, but is not limited to, one or more user devices 310 and any number and type of other devices, such as docking systems 370. In one embodiment, the devices 310 and 370 may be embodied by the devices 110 and 140 in FIG. 1, respectively. In one embodiment, a user device 310 may communicate with the docking system 370, and/or other devices on the network 305, to form a peer-to-peer group that includes any number of devices on the network 305.

The devices 310 and 370 may include one or more processors configured to communicate with one or more memory devices and various other components or devices. For example, the user device 310 may include one or more devices that include one or more processors 312, one or more input/output (I/O) devices 314, storage 316, one or more communication connections 318, and one or more data stores 322. The one or more processors 312 may be implemented as appropriate in hardware, software, firmware, or a combination thereof. The one or more processors 372 associated with the docking system 370 may be the same or at least similar to the processor 312.

The memory 324 associated with the user device 310 may store program instructions that are loadable and executable on the processor 312, as well as data generated during the execution of these programs. Depending on the configuration and type of the user device 310, the memory 324 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memory 384 associated with the docking system 370 may be the same or at least similar to the memory 324.

The storage 316 associated with the user device 310 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing system. The storage 376 associated with the docking system 370 may be the same or at least similar to the storage 316.

The memories 324 and 384, and the storage 316 and 376, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 314 associated with the user device 310 may enable a user to interact with the user device 310 to perform various functions. The I/O devices 314 may include, but are not limited to, a keyboard, a mouse, a pen, a voice input device, a touch input device, a gesture detection or capture device, a display, a camera or an imaging device, speakers, and/or a printer. The I/O devices 374 associated with the docking system 370 may be the same or at least similar to the I/O devices 314.

The communication connections 318 associated with the user device 310 may allow the user device 310 to communicate with various other devices, such as the docking system 370, over the one or more wireless networks 305. The communication connections 318 may include one or more antennas 320 and one or more radios 319, which may include hardware and software for sending and/or receiving wireless signals over the various types of networks 305 described above. The communication connections 378 associated with docking system 370 may be the same or similar to the communication connections 318. Some embodiments may include a wireless access point, such as the access point 170 in FIG. 1, which may also be configured to communicate wireless signals over the networks 305.

The one or more data stores 322 may store lists, arrays, databases, flat files, etc. In some implementations, the data store 322 may be stored in a memory that is external to the user device 310 but may be accessible via one or more networks, such as with a cloud storage service. The data store 322 may store information that may facilitate establishing a PBSS over a wireless network to facilitate peer-to-peer group communication. Such information may include a unique identifier (e.g., a MAC address) of the devices in FIG. 3, such as the user devices 310 and the docking system 370, a direction in which the devices 310 and 370 are located, and various other information about the devices 310 and 370 to facilitate communication between these devices. The stored information may also include profile information that may be used to select a device for engaging in a process to establish a PBSS. The stored information may further include predetermined time limits (e.g., 200.0 milliseconds, 500.0 milliseconds, 1.0 seconds, etc.) for establishing the PBSS and/or formation of the peer-to-peer group. Numerous other information to facilitate the processes described herein may also be stored.

Turning to the contents of the memory 324, the memory 324 may include, but is not limited to, an operating system (not depicted), a communications module 325, a discovery management module 326, a device selection module 330, a PCP selection module 332, a PBSS management module 334, and a peer-to-peer group formation module 342. Each of these modules may be implemented as individual modules that provide specific functionality associated with establishment of a PBSS over a wireless network to facilitate peer-to-peer communication, as described herein. Alternatively, one or more of these modules may perform all or at least a portion of the functionality associated with the other modules.

The operating system may refer to a collection of software that manages computer hardware resources and provides common services for computer programs to enable and facilitate the operation of such programs. Example operating systems may include UNIX, Microsoft Windows, Apple OS X, etc. The docking system 370 may include an operating system that may be the same or similar to the operating system of the memory 324.

The communication module 325 may implement or facilitate wireless communication (e.g., peer-to-peer (P2P), WiFi, WiFi Direct, etc.) between devices in FIG. 3. For example, the communication module 325 may also include various modulation techniques for modulating signals. In one implementation, such signals may include information in frames distributed over the one or more networks 305, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), single carrier (SC) modulation among other techniques. Each of the devices shown in FIG. 3 may utilize such modulation techniques (e.g., via a modulator), as well as demodulation techniques (e.g., via a demodulator) to access information from a modulated signal.

The discovery management module 326 may perform functions associated with discovering devices, such as a user device 310 or a docking system 370, on the network 305. In certain embodiments herein, communication between the devices in FIG. 3 may be ad hoc, or may not involve an access point, such as the access point 170 in FIG. 1. In other embodiments, communication may involve an access point. In one example, a user device 310 may communicate with another user device 310 to establish a PBSS. In another example, a user device 310 may communicate with a docking system 370 to establish a PBSS. Any number or combination of devices may communicate with one another to establish a PBSS.

The discovery implemented by the discovery management module 326 may be unfocused or focused. As referred to herein, unfocused discovery may include the discovery management module 326 sending beacon transmissions in one or more directions over the network 305. Such beacon transmissions may be performed in accordance with active scanning or other 802.11ad techniques. In one embodiment, a broadcast beacon marked as a discovery beacon (e.g., discovery mode set to one (1)) and without a value in the ABFT responder field, may be transmitted by the discovery management module 326.

Unfocused discovery may also include the discovery management module 326 receiving responses to the beacon transmissions. Such responses may include an identification (e.g., a MAC address) and a direction of the responding device, among other information. The direction may be determined based on ABFT performed between devices engaged in the discovery process (e.g., via the discovery management module 326).

Unfocused discovery may also include exchanging information, such as capabilities information, between the devices in FIG. 3. For example, the discovery management module 326 associated with the user device 310 may send a probe request to a target device, such as the docking system 370, that identifies the capabilities of the user device 310. The discovery management module 326 may also receive a probe response that includes information about the responding device, or the docking system 370 in the present example. Such probe exchanges may be facilitated by beamforming the probe request and response in the direction of the intended device based on the directional information shared during the beacon exchanges.

Focused discovery may include targeting a particular device, such as a device selected by the PCP selection module 332 described below, beamforming in a direction of the targeted device, sending a discovery beacon to the targeted device, and receiving information about the targeted device.

Focused discovery may also include signaling to a targeted device that the sending device desires to engage, involve, partner with, communicate with, or otherwise include the target device in a process of establishing a PBSS. The signaling may be performed by a PBSS trigger module 328, which may be part of the discovery management module 326, as shown. In one embodiment, the signaling may include the PBSS trigger module 328 modifying the receive ABFT responder field of the discovery beacon to include the MAC address of the target device. Upon receiving the discovery beacon, the target device may determine that it has been selected to engage in the process of establishing a PBSS with the device that sent the signal requesting the engagement. The target device may thereafter join the PBSS and continue forming the peer-to-peer group, as will be described in greater detail below.

Focused discovery may also include the discovery management module 326 sending a probe request to the target device that includes updated information about the sending device. The updated information may include a new direction in which the sending device is located, new capabilities information, a status associated with the capabilities, etc. In some embodiments, multiple discovery beacons in conjunction with ABFT responses may be sent continuously, periodically, according to a schedule, etc., to facilitate communicating renewed or updated information associated with the devices in FIG. 3. Such information may be used to maintain a communications link between the devices that are negotiating the determination of a group owner. In certain embodiments herein, full beamforming (BF) or Beam Refinement Protocol (BRP) sequences may be used to maintain such a link.

The discovery management module 326 may also receive a response to the probe request, which may include similar updated information about the responding or target device. The probe request and response may be performed in accordance with the 802.11ad standard. The information exchanged via the probes may be used by the engaged devices (e.g., the targeted device and the device that selected the targeted device to engage in the process of establishing the PBSS) to negotiate determination of a PCP, which may be based on the 802.11ad standard in one embodiment. Either of the engaged devices may be selected as the PCP, which may be performed by the PCP selection module 332 associated with the devices.

The PBSS management module 334 may perform functions associated with establishing a PBSS and utilizing the PBSS to form a peer-to-peer group and determine a group owner of the group. The PBSS management module 334 may include, but is not limited to, a PBSS initialization module 336, a scheduler module 338, and a power save module 340.

The PBSS initialization module 336 may perform functions associated with establishing a PBSS. The established PBSS may be used to communicate P2P messages, such as PD, GON, or Invitation messages, between engaged devices to facilitate forming a peer-to-peer group and determining a group owner of the peer-to-peer group. In certain embodiments herein, the PBSS may be established before the exchange of such P2P messages, thereby beginning link maintenance flows for the P2P messages. In one embodiment, a device that is selected as the PCP may begin establishment of the PBSS and may thereafter (e.g., immediately after successful focused discovery) send non-discovery beacons (e.g., discovery mode is set to zero (0)) on the network 305 in a known direction of the target device (or the target device in the present example by virtue of another device being selected as the PCP).

The target device may search for and receive the non-discovery beacons from the sending device. In one embodiment, the non-PCP may begin such searching immediately (e.g., after successful focused discovery) for the non-discovery beacons. Upon receiving the non-discovery beacons, the non-PCP (e.g., via the PBSS initialization module associated with the non-PCP) may synchronize with or join the PBSS, and may continue formation of the peer-to-peer group according to the peer-to-peer protocol, in one embodiment.

By the PCP and non-PCP beginning sending of discovery beacons and searching for non-discovery beacons, respectively, immediately after successful focused discovery (or the receipt of a probe response from the target device, in one embodiment), switching from discovery mode to establishment and utilization of a PBSS may be signaled, communicated, or otherwise known to the engaged devices. Use of "immediately after successful focused discovery" is not meant to be limiting. Near immediately, without delay, relatively close in time, as a next action performed by the PCP or non-PCP, or similar, may be used in place of immediately above.

The scheduler module 338 may perform functions associated with maintaining reliable communications between the devices establishing a PBSS. Performing such functions may be required due to the relatively long time that it may take to form a peer-to-peer group, which may be due at least in part to delayed input from users (e.g., up to 120 seconds allowed for user input by peer-to-peer specification), movement or repositioning of devices, interference with wireless communications between devices, or other challenges to maintaining a beamlink during formation of a peer-to-peer group. To address such issues, the scheduler module 338 may implement a time limit for forming a peer-to-peer group, and may schedule peer-to-peer communications according to a beacon time interval, as described below.

The scheduler module 338 may set a time limit to restrict the amount of time that devices may negotiate to form a peer-to-peer group. Beyond such time, the devices may disengage for the purpose of forming the peer-to-peer group and may be available to engage with other devices. The time limit may be a predetermined value (e.g., 300.0 milliseconds, 500.0 milliseconds, 2 seconds, etc.). The predetermined value may be based on a historical amount of time that it takes to form a peer-to-peer group as facilitated by an established PBSS described herein. Other considerations may be used to determine the predetermined value in other embodiments.

To implement the time limit, the scheduler module 338 may include a time value corresponding to the time limit in a field of a discovery beacon, in one embodiment. The field in which the time limit may be indicated may be an existing, unused field, while a new field may be created to store such information, in various embodiments. In one embodiment, the PCP may establish the time limit and send it to the non-PCP. Both devices, upon identifying the time limit, may set a counter corresponding to the time limit that, when reached, may trigger the devices to disengage from the process of forming the peer-to-peer group, among other actions.

The scheduler module 338 may also schedule communications with a target device engaged in the process of forming a peer-to-peer group. The scheduling may include the scheduler module 338 sending peer-to-peer messages, such as PD, GON, and Invitation messages, to the target device according to a beacon time interval. In this way, messages missed by the target device (e.g., as a result of link troubles, user interference or delays, etc.), may be received at a beacon transmission interval that may be known or expected by the target device. Such scheduling of messages may therefore facilitate reliable communications between devices engaged to form a peer-to-peer group.

Also by virtue of scheduling communication by the scheduler module 338, devices engaged in the process of forming the peer-to-peer group may conserve power. For example, after receiving a discovery beacon that includes a beacon time interval, the target device may enter power save or sleep mode, or put another way, may turn off or disable at least a portion of its functions. The target device may wake up from sleep mode at the beacon transmission interval (or other times) such that it may receive and process messages associated with forming a peer-to-peer group. Such entering and waking up from power save mode may be implemented by the power save module 340, in one embodiment. In some embodiments, a device that has entered power save mode may continue to receive scheduled messages from the PCP, a device with which it has engaged for the purpose of forming a peer-to-peer group, or other devices.

If the negotiation process for forming a peer-to-peer group is complete, then the peer-to-peer group formation module 342 may form the peer-to-peer group and determine a group owner of the peer-to-peer group. The formation of the peer-to-peer group may be performed by exchanging negotiation messages between the devices in FIG. 3 for forming the peer-to-peer group, including PD, GON, and Invitation messages as described above. Formation of the peer-to-peer group may be performed according to the peer-to-peer protocol, in one implementation. Devices engaged in forming a peer-to-peer group may receive a confirmation message that the group has been confirmed, and may thereafter communicate with one another using the peer-to-peer protocol, in one embodiment. By virtue of establishing a PBSS before the peer-to-peer group is formed, the peer-to-peer group may be formed in more reliable fashion, for example, using full beamforming (BF) or BRP sequence communication.

The memory 384 of the docking system 370 may include various modules such as, but not limited to, a docking PBSS management module 386 and a docking service(s) 388. The docking PBSS management module 386 may include the same or similar modules (not shown) as those described in the memory 324 of the user device 310, and may configure the PBSS management module 386 to perform the same or similar functions. The docking services 388 may configure the docking system to provide any number of functions, such as providing access to device peripherals, providing access to web-based content or other information, etc.

The above descriptions in FIG. 3 are for purposes of illustration and are not meant to be limiting. While a particular device, such as the user device 310, may be shown and described as performing certain functionality, any number or type of other devices may perform the same or similar functions. For example, a target device is described above as responding to discovery beacons, requests to engage in the formation of a peer-to-peer group, etc. The target device may, however, initiate requests for such information from other devices. The target device may, therefore, be an initiating device (as described above) in other examples. In this way, each device described herein may be configured to perform at least a portion of any of the functions described in association with other devices. Further, a time limit may be set for establishing both a PBSS and for forming a peer-to-peer group. In either instance, discovery beacons may be modified to indicate such time limits prior to establishment of the PBSS, or prior to formation of the peer-to-peer group.

Figure 4:
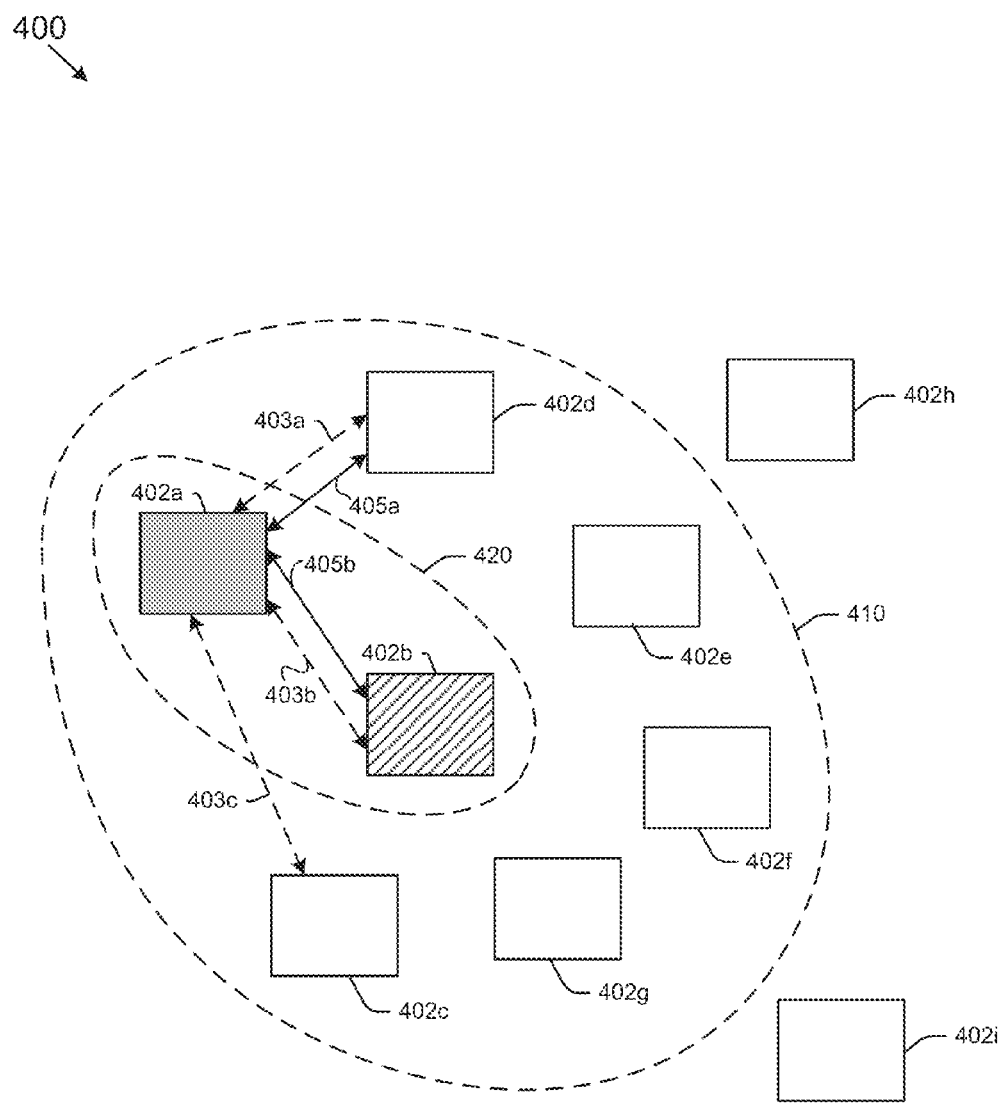
FIG. 4 illustrates a block diagram of a process for forming a peer-to-peer group using an established PBSS, according to an embodiment of the disclosure.

FIG. 4 depicts a block diagram of a process for forming a peer-to-peer group using an established PBSS, according to an embodiment of the disclosure. Numerous devices, such as the devices 402a-i, may communicate with each other to establish a PBSS, and may subsequently form a peer-to-peer group and determine a group owner of the peer-to-peer group using the established PBSS. An example of forming a peer-to-peer group using a PBSS may be as follows.

The device 402a may send discovery beacons in multiple directions. For example, the device 402a may send a discovery beacon to devices 402b, 402c, and 402d, as indicated by the dotted lines 403a, 403b, and 403c, respectively. Although a straight line is drawn from the device 402a to each of the devices 402, the discovery beacons 403a-c may be omnidirectional instead of directional, hence the dotted line in the present example. By way of omnidirectional transmissions, any device within range of the device 402a, such as the devices 402b-g encircled by the dotted area 410, may receive the discovery beacon. A dotted line has not been drawn to each device in the area 410, however, for ease of illustration. Devices outside of the dotted area 410, such as the devices 402h and 402i, may be out of range of the device 402a and therefore may not receive the discovery beacon.

The discovery beacon transmissions indicated by the dotted lines 403a-c may include information about the device 402a, such as device parameters, capabilities information, identifying information, etc. The device 402a may receive a response (e.g., an ABFT allocation response) to the discovery beacon from the devices 402b-d, as indicated by the double arrows on the dotted lines 403a-c. The respective responses may include various information, such as a direction in which the devices 402b-d are located, a MAC address of the devices 402b-d, an address of the device to which the response is being sent (e.g., the device 402a), as well as other information.

The device 402a may determine a device with which to engage for establishing a PBSS to facilitate formation of a peer-to-peer group. In so doing, the device 402a may receive a selection of such a device from a user, for example. The device 402a may also determine such a device without user interaction, for example, by selecting the device based on predefined or predetermined profiles, configurations, or other information.

In the present example, the device 402a may determine to engage with the device 402d. After such a determination, the device 402a may send a discovery beacon in a direction of the selected device 402d, as indicated by the solid arrow 405a. The transmission may be sent as a unicast beacon, in one embodiment. The discovery beacon may include the MAC address of the device 402d (e.g., in the ABFT responder field of the discovery beacon), which may signal to the device 402d that the device 402a desires to engage the device 402d for establishing a PBSS. The device 402d may respond with an acknowledgement to the discovery beacon, which may include an address or unique identifier of the device 402d, as well as an address or unique identifier of the device 402a, among other information. The response may indicate to the device 402a that the device 402d will engage in establishment of the PBSS.

The device 402a and the device 402d may thereafter exchange probe messages to obtain updated information about one another. For example, the device 402a may send a probe request to the device 402d, and the device 402d may send a probe response to the device 402a. The device 402a and the device 402d may analyze such information to determine which of the devices should become the PCP. In the present example, the device 402a may become the PCP based on the probe exchange. The device 402d may consequently become the non-PCP.

The device 402a in its role as PCP may establish a PBSS and may send a request that the device 402d join the PBSS. Such a request may be sent immediately after successful focused discovery, which may be after the device 402a receives an acknowledgement in a probe response from the device 402d, in one implementation. The device 402d, which has been engaged by the device 402a, may immediately begin searching for requests to join the PBSS. The device 402a may send a non-discovery beacon to the device 402d, which may receive the discovery beacon, join the PBSS, and continue forming the peer-to-peer group. The device 402d may also send a response to the device 402a indicating that the device 402d has joined the PBSS, among other indications.

The devices 402a and 402d may negotiate forming the peer-to-peer group by exchanging peer-to-peer messages, such as PD, GON, and/or Invitation messages, using the established PBSS. A certain amount of time (e.g., a time limit) may be established for forming the peer-to-peer group. In the present example, negotiations to form a peer-to-peer group by the device 402a and the device 402d may exceed 200.0 milliseconds, which may have been established as a time limit. After such time has been exceeded, the device 402d may disassociate from, or unsynchronize with, the PBSS associated with the device 402a. The device 402a may also disassociate from the device 402d. The solid line 405a may indicate such disassociation. The device 402d and the device 402a may thereafter establish another PBSS and/or negotiate to form another peer-to-peer group with any of the other devices in FIG. 4 that are within their range of communication. Put another way, devices that have made a connection decision (e.g., selected a device to engage) and begun focused discovery, but have not successfully completed focused discovery (e.g., have not completed the probe exchange 236 in FIG. 2 due to a beacon not being answered, a probe not being successful, etc.), may stop its attempts of focused discovery and may return to unfocused discovery. Devices that have not made a local connection decision may continue performing unfocused discovery.

In the present example, the device 402a may engage the device 402b in similar fashion that it engaged the device 402d to establish a PBSS. The solid line 405b may indicate such an engagement. The device 402a and 402b may ultimately form a peer-to-peer group and determine a group owner of the peer-to-peer group. In the present example, the device 402b may be determined to be the group owner based on the information exchanged between the device 402a and the device 402b during the peer-to-peer message exchanges. The device 402b is shown with etched lines to illustrate its role as group owner. The device 402a is shown as shaded to illustrate its role as PCP. In other examples, a device that is selected as the PCP may also be the group owner. In this way, roles or functions associated with establishing a PBSS, forming a peer-to-peer group, and determining a group owner of the peer-to-peer group may change between various devices on a wireless network. The determination of which devices will perform such functions may be facilitated herein by establishing a PBSS before peer-to-peer messages are exchanged for the purpose of forming a peer-to-peer group.

As described above, peer-to-peer messages may be communicated according to a schedule by virtue of implementing a PBSS before the peer-to-peer group is formed. A target device, such as the devices 402b and 402d, may enter power save mode in such implementations. Devices in power save mode may continue to answer transmissions associated with focused discovery, such as the focused discovery 230 in FIG. 2. For example, devices listening to discovery beacons, such as the devices 402b and 402d, may reduce their responses on ABFT allocations to save power, reduce interference to other devices, etc. Such devices may not need to remain awake and respond to beacons from devices with which they are not engaged, and therefore, may conserve power.

Each of the devices in FIG. 4 may perform actions that are the same or similar to those described above for the devices 402a, 402b, and 402d. Devices that have not selected a device with which to engage for establishing a PBSS and forming a peer-to-peer group may continue transmitting discovery beacons to identify potential devices to engage for such purposes. While the above PBSS establishment and peer-to-peer group formation includes only two devices, more devices may engage in the process of establishing and joining the PBSS, and subsequently forming a peer-to-peer group and determining a group owner. For example, a PBSS may include any number of devices, and all or at least a portion of such devices, or different devices, may negotiate to form a peer-to-peer group and determine a group owner using the processes described herein.

Figure 5:
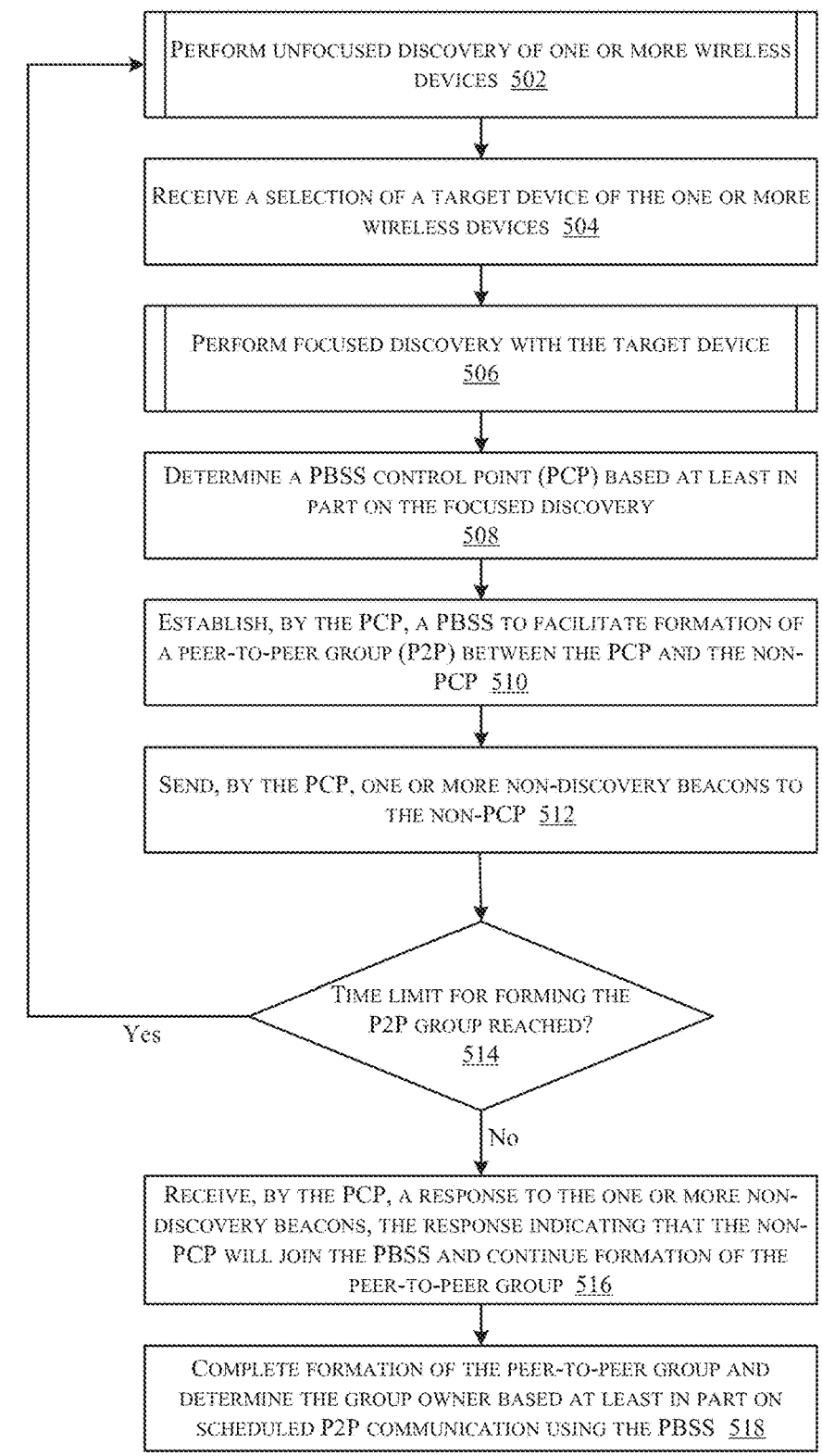
FIG. 5 illustrates a flow diagram of an example process for establishing a PBSS over a wireless network to facilitate P2P communication, according to an embodiment of the disclosure.

FIG. 5 depicts a flow diagram of an example process 500 for establishing a PBSS over a wireless network to facilitate P2P communication, according to an embodiment of the disclosure. The example process 500 may be performed by the user device 310 in FIG. 3, which may be referred to below as the initiating device, and by the docking system 370, which may be referred to below as the target device, in an example embodiment.

The example process 500 may begin at block 502, where the initiating device may perform unfocused discovery of one or more wireless devices (e.g., via the discovery management module 326). In so doing, the initiating device may send broadcast messages in multiple directions to discover devices within range. The broadcast messages may be transmitted as discovery beacons according to a beacon time interval. Example processes associated with performing unfocused discovery will be described below in association with FIG. 6.

At block 504, the initiating device may receive a selection of a target device of the one or more wireless devices that responded to the discovery beacons (e.g., via the device selection module 330). The selection may indicate that the selected target device is desired to be engaged for the purpose of establishing a PBSS with the initiating device to facilitate formation of a peer-to-peer group. The selection of the target device may be based on user input or may be determined by the initiating device based on a user or system profile or configuration, in various embodiments herein.

The initiating device may perform focused discovery with the target device (e.g., via the discovery management module 326) at block 506. During such discovery, the initiating device may trigger or signal to the target device that the initiating device desires to engage the target device for establishing the PBSS (e.g., via the PBSS trigger module 328). Example processes associated with such focused discovery will be described below for FIG. 7.

A personal basic service set (PBSS) control point (PCP) may be determined based at least in part on the focused discovery (e.g., via the PCP selection module 332) at block 508. A non-PCP may also be determined and may be a device that was not selected as the PCP. In the present example, the initiating device or the target device may be determined to be the PCP.

A PBSS may be established by the PCP to facilitate formation of a peer-to-peer group between the PCP and the non-PCP (e.g., via the PBSS initialization module 336) at block 510. The PCP may send one or more non-discovery beacons to the non-PCP at block 512. The non-discovery beacons may include peer-to-peer messages (e.g., PD messages, GON messages, Invitation messages, etc.) for forming a peer-to-peer group. The messages may be sent according to a schedule, such as a beacon time interval, every 100.0 milliseconds, 200.0 milliseconds, or any other time interval (e.g., via the scheduler module 338). The peer-to-peer messages may be based on the peer-to-peer protocol.

At block 514, a check may be performed to determine whether a time limit for forming the peer-to-peer group has been reached. If such a time limit has been reached, then formation of the peer-to-peer group by the PCP and the non-PCP may end and both devices may engage other devices for such purpose, or perform other functions. As shown, processing may return to block 502, where unfocused discovery may be performed in such instances.

If the time limit for forming a peer-to-peer group has not been reached, then processing may continue to block 516, where the PCP may receive a response (e.g., from the non-PCP) to the one or more non-discovery beacons sent at block 512. The response may also include peer-to-peer messages (e.g., PD, GON, and Invitation messages) as part of negotiating formation of the peer-to-peer group.

Formation of the peer-to-peer group may be completed, and a group owner of the peer-to-peer group may be determined (e.g., via the peer-to-peer group formation module 342), at block 518. The group may be formed according to the standard peer-to-peer protocol, in one embodiment. The established PBSS may the formation and determination of a group owner by communicating the peer-to-peer group formation messages using PBSS techniques. For example, the peer-to-peer messages may be exchanged according to a beacon time interval (e.g., via the scheduler module 338) such that devices engaged in forming the peer-to-peer group may know when to expect such messages. If the messages are lost due to interference, for example, the devices may receive the messages again at the next beacon transmission interval. The devices may also enter power save mode (e.g., via the power save module 340) until the messages are expected to arrive, thereby conserving power.

Figure 6:
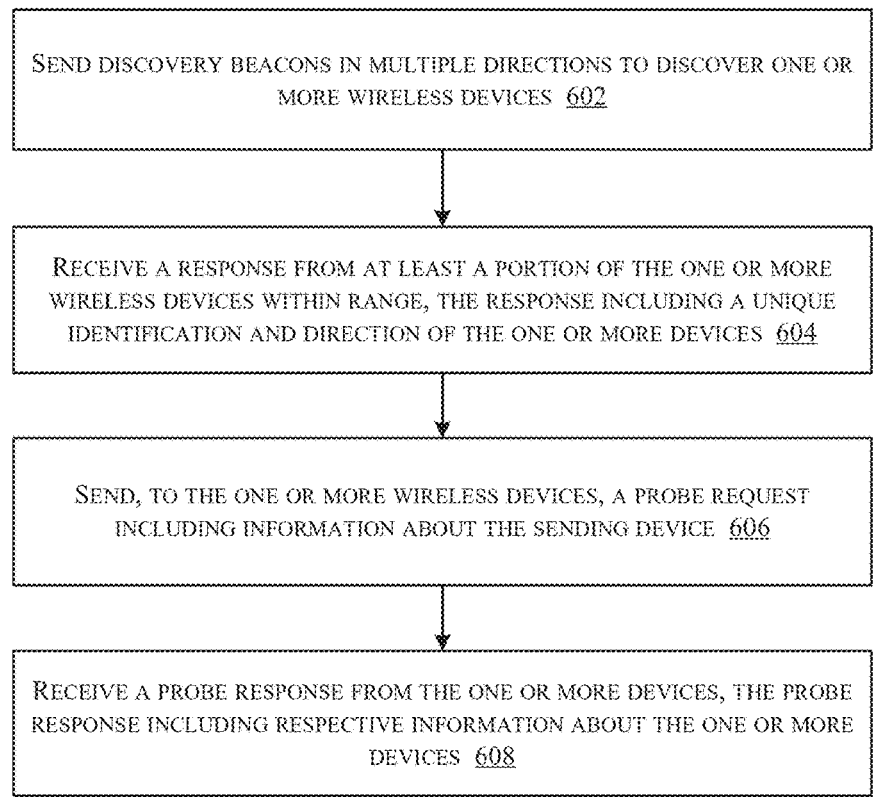
FIG. 6 illustrates a flow diagram of an example process for performing unfocused discovery, according to an embodiment of the disclosure.

FIG. 6 depicts a flow diagram of an example process 502 for performing unfocused discovery, according to an embodiment of the disclosure. Discovery beacons may be transmitted in multiple directions to discover wireless devices within range of the transmitting device (e.g., the initiating device in FIG. 5) at block 602. Such transmissions may be performed in accordance with the 802.11ad standard and may include active scanning techniques, in one implementation.

A response to the discovery beacons (e.g., an ABFT response) may be received from one or more devices within range of the transmitting device. The response may include various information associated with the one or more devices, such as a unique identification of the devices (e.g., a MAC address), a direction in which the devices are located (e.g., in association with ABFT), etc. Such a direction may be used by the transmitting device to complete unfocused discovery (e.g., sending a probe request), and may be used during focused discovery to send messages in a direction of a targeted device.

A probe request may be sent by the transmitting device to the one or more wireless devices within range at block 606. The probe request may include updated information about the transmitting device, such as identification and capabilities information. A probe response from the one or more wireless devices, which may also include respective identification and capabilities information of the one or more wireless devices, may be received at block 608. After the unfocused discovery described in FIG. 6 has been performed, processing may return to block 504 in FIG. 5, as shown.

Figure 7:
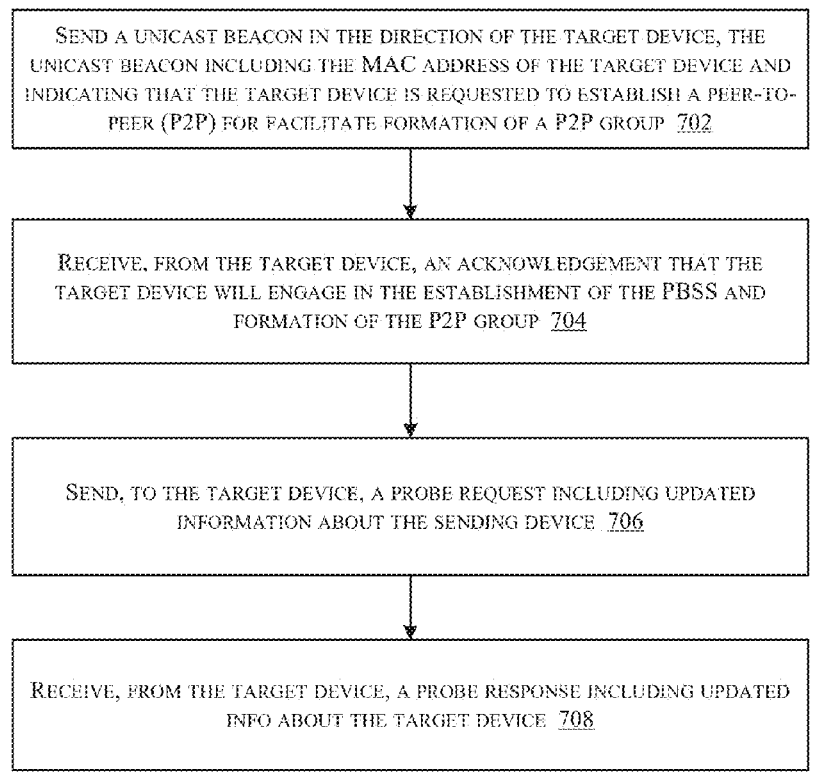
FIG. 7 illustrates a flow diagram of an example process for performing focused discovery, according to an embodiment of the disclosure.

FIG. 7 depicts a flow diagram of an example process for performing focused discovery, according to an embodiment of the disclosure. At block 702, a discovery beacon may be sent in the direction of a targeted device that has been selected for engagement to establish a PBSS, at block 702. The discovery beacon may be a unicast beacon, in one embodiment. The discovery beacon may include a trigger or signal that notifies the target device that it has been selected for such engagement. In one embodiment, the signal may include an indication of the MAC address of the target device in the ABFT responder field of the discovery beacon. Upon receiving the discovery beacon, the target device may determine, based on the indication in the ABFT responder field, that it has been requested to engage in establishment of the PBSS.

The targeted device may send a response, which may be received by the transmitting device at block 704. The response may include an acknowledgement that the targeted device will engage in establishment of the PBSS with the device that transmitted the discovery beacon.

A probe request may be sent to the target or engaged device at block 706. The probe request may include updated information about the device that transmitted the probe request. A probe response may be received from the target device at block 708. The probe request may include updated information about the target device, such as a new direction in which the target device is located, updated capabilities information, or other information that may be used to form a peer-to-peer group and determine a group owner of the group according to the peer-to-peer protocol, in one implementation. After the focused discovery described in FIG. 5 has been performed, processing may return to block 508 in FIG. 5, as shown.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

In example embodiments of the disclosure, there is disclosed a device. The device may include a modulator, a demodulator, and at least one processor. The at least one processor may be configured to receive respective information associated with one or more candidate devices, the respective information including a respective unique identifier of the candidate devices and a direction of the one or more candidate devices. The at least one processor may be configured to determine a target device of the one or more candidate devices with which to engage to establish a personal basic service set (PBSS) to facilitate formation of a peer-to-peer group including the device and the target device. The at least one processor may be configured to beamforming in the direction of the target device. The at least one processor may be configured to send a unicast beacon to the target device based at least in part on the beamforming, wherein an association beamforming training (ABFT) responder field of the unicast beacon includes the respective unique identifier of the target device, wherein the unicast beacon indicates a request that the target device engage the device to establish the PBSS. The at least one processor may be configured to receive an acknowledgement from the target device, the acknowledgement including an indication that the target device has engaged with the device to establish the PBSS. The at least one processor may be configured to establish the PBSS to facilitate formation of the peer-to-peer group. The at least one processor may be configured to send, at a beacon time interval using the PBSS, one or more messages for forming the peer-to-peer group with the target device. The one or more messages may include one or more first messages, and wherein the at least one processor may be further configured to determine that the device is a PBSS control point (PCP) based at least in part on respective capabilities of the device and the target device.

Establishing the PBSS may include the at least one processor to be further configured to send at least one non-discovery beacon to the target device, the at least one non-discovery beacon including one or more second messages associated with formation of the peer-to-peer group with the target device; and after sending the at least one non-discovery beacon, receive at least one response from the target device, the at least one response including (i) an indication that the target device has joined the PBSS and (ii) one or more third messages associated with formation of the peer-to-peer group with the device.

The at least one processor may be configured to determine that the peer-to-peer group has been formed based at least in part on the one or more messages for forming the peer-to-peer group, and determine that the device or the target device is a group owner of the peer-to-peer group. The at least one processor may be configured to send one or more discovery beacons in a plurality of directions to the one or more candidate devices; and in response to sending the one or more discovery beacons, receive one or more respective ABFT responses to the one or more discovery beacons, the one or more ABFT responses including the respective information. The at least one processor may be configured to, after receiving the acknowledgement from the target device, send a probe request to the target device, the probe request including first information associated with the device, receive a probe response from the target device, the probe response including second information associated with the target device; and determine a PCP for creating the PBSS, the determination of the PCP based at least in part on the first information and the second information.

The device may further include at least one radio, and at least one memory. The device may further include at least one antenna. The target device may include a first target device, the at least one processor may be further configured to determine a time limit for forming the peer-to-peer group, after determining that the time limit has been reached, disengage with the target device, and determine a second target device of the one or more candidate devices with which to engage to establish the PBSS to facilitate forming the peer-to-peer group. Wherein determining the target device, the at least one processor may be further configured to receive a selection of the target device from a user or determine the target device based at least in part on a predetermined configuration.

According to example embodiments of the disclosure, there is disclosed a system. The system may include at least one radio, at least one antenna, at least one memory including computer-executable instructions; and at least one processor. The at least one processor, when executing the computer-executable instructions, may be configured to receive, from an initiator device, a discovery beacon including a first unique identification of the initiator device and a first direction of the initiator device. The at least one processor, when executing the computer-executable instructions, may be configured to beamform in the first direction of the initiator device. The at least one processor, when executing the computer-executable instructions, may be configured to send an association beamforming training (ABFT) response to the initiator device, the ABFT response including a Media Access Control (MAC) address of the system and a second direction of the system. The at least one processor, when executing the computer-executable instructions, may be configured to receive a unicast beacon from the initiator device, the unicast beacon including the MAC address of the system in an ABFT responder field of the unicast beacon and an indication that the initiator device requests engagement with the system to establish a personal basic service set (PBSS) to facilitate formation of a peer-to-peer group including the system and the initiator device.

The at least one processor, when executing the computer-executable instructions, may be configured to associate with the PBSS based at least in part on the unicast beacon. The at least one processor, when executing the computer-executable instructions, may be configured to send, at a beacon time interval using the PBSS, one or more messages for forming the peer-to-peer group with the initiator device. The at least one processor, when executing the computer-executable instructions, may be further configured to send an acknowledgement to the initiator device that the system has associated with the PBSS. The at least one processor, when executing the computer-executable instructions, may be further configured to determine that the system is a PCP based at least in part on respective capabilities of the device and the initiator device, send at least one non-discovery beacon to the initiator device. The at least one non-discovery beacon may include one or more second messages associated with formation of the peer-to-peer group with the initiator device.

After sending the at least one non-discovery beacon, the at least one processor may be further configured to receive at least one response from the initiator device, the at least one response including (i) an indication that the initiator device has joined the PBSS and (ii) one or more third messages associated with formation of the peer-to-peer group with the system. The one or more messages may include one or more first messages, and the at least one processor, when executing the computer-executable instructions, may be further configured to determine that the system is a non-PCP based at least in part on respective capabilities of the device and the initiator device, wherein associating with the PBSS includes the at least one processor being further configured to monitor for one or more non-discovery beacons from the initiator device and receive at least one non-discovery beacon from the initiator device. The at least one non-discovery beacon may include one or more second messages associated with formation of the peer-to-peer group with the system.

The at least one processor may be further configured to send at least one response to the at least one non-discovery beacon, the at least one response including (i) an indication that the system has associated with the PBSS and (ii) one or more third messages associated with formation of the peer-to-peer group with the initiator device. The at least one processor, when executing the computer-executable instructions, may be further configured to enter power save mode until the beacon time interval is reached; and wake up from power save mode to receive the one or more messages for forming the peer-to-peer group. The at least one processor, when executing the computer-executable instructions, may be further configured to determine that the peer-to-peer group has been formed based at least in part on the one or more messages for forming the peer-to-peer group, and determine that the system or the initiator device is a group owner of the peer-to-peer group. The at least one processor, when executing the computer-executable instructions, may be further configured to receive a probe request from the initiator device, the probe request including first information associated with the initiator device and send a probe response to the initiator device. The probe response may include second information associated with the system. The at least one processor may be further configured to determine a PCP for creating the PBSS. The determination of the PCP may be based at least in part on the first information and the second information.

According to example embodiments of the disclosure, there is disclosed a method. The method may include receiving, by a first device, respective information associated with one or more candidate devices, the respective information including a respective unique identifier of the candidate devices and a direction of the one or more candidate devices. The method may include determining, by the first device, a target device of the one or more candidate devices with which to engage to establish a personal basic service set (PBSS) to facilitate formation of a peer-to-peer group including the first device and the target device. The method may include beamforming, by the first device, in the direction of the target device. The method may include sending, by the first device, a unicast beacon to the target device based at least in part on the beamforming, wherein an association beamforming training (ABFT) responder field of the unicast beacon includes the respective unique identifier of the target device, wherein the unicast beacon indicates a request that the target device engage the first device to establish the PBSS.

The method may also include receiving, by the first device, an acknowledgement from the target device, the acknowledgement including an indication that the target device has engaged with the first device to establish the PBSS. The method may include establishing, by the first device, the PBSS to facilitate formation of the peer-to-peer group. The method may include sending, by the first device, at a beacon time interval using the PBSS, one or more messages for forming the peer-to-peer group with the target device. The method may further include determining, by the first device, that the first device is a PBSS control point (PCP) based at least in part on respective capabilities of the first device and the target device, wherein establishing the PBSS may include sending at least one non-discovery beacon to the target device. The at least one non-discovery beacon may include one or more second messages associated with formation of the peer-to-peer group with the target device.

The method may further include, after sending the at least one non-discovery beacon, receiving at least one response from the target device, the at least one response including (i) an indication that the target device has joined the PBSS and (ii) one or more third messages associated with formation of the peer-to-peer group with the first device. The method may further include determining, by the first device, that the peer-to-peer group has been formed based at least in part on the one or more messages for forming the peer-to-peer group, and determining, by the first device, that the first device or the target device is the group owner of the peer-to-peer group. The method may further include sending, by the first device, one or more discovery beacons in a plurality of directions to the one or more candidate devices, and in response to sending the one or more discovery beacons, receiving, by the first device, one or more respective ABFT responses to the one or more discovery beacons, the one or more ABFT responses including the respective information.

The method may further include after receiving the acknowledgement from the target device, sending, by the first device, a probe request to the target device, the probe request including first information associated with the first device, receiving, by the first device, a probe request from the target device, the probe request including second information associated with the target device, and determining, by the first device, a PCP for creating the PBSS, the determination of the PCP based at least in part on the first information and the second information. The method may further include determining, by the first device, a time limit for forming the peer-to-peer group, after determining that the time limit has been reached, disengaging, by the first device, with the target device, and determining, by the first device, a second target device of the one or more candidate devices with which to engage to establish the PBSS to facilitate forming the peer-to-peer group. Wherein determining the target device may further include receiving a selection of the target device from a user or determining the target device based at least in part on a predetermined configuration.

According to example embodiments of the disclosure, there is disclosed one or more computer-readable media storing computer-executable instructions that, when executed by at least one processor, configure the at least one processor to perform operations. The operations may include receiving, from an initiator device, a discovery beacon including a first unique identification of the initiator device and a first direction of the initiator device. The operations may include beamforming in the first direction of the initiator device. The operations may include sending an association beamforming training (ABFT) response to the initiator device, the ABFT response including (i) a Media Access Control (MAC) address of a device including the at least one processor and (ii) a second direction of the device. The operations may include receiving a unicast beacon from the initiator device, the unicast beacon including the MAC address of the device in an ABFT responder field of the unicast beacon and an indication that the initiator device requests engagement with the device to establish a personal basic service set (PBSS) to facilitate formation of a peer-to-peer group including the device and the initiator device.

The operations may also include associating with the PBSS based at least in part on the unicast beacon. The operations may include sending, at a beacon time interval using the PBSS, one or more messages for forming the peer-to-peer group with the initiator device. The operations may further include sending an acknowledgement to the initiator device that the device has associated with the PBSS. The operations may further include determining that the device is a PCP based at least in part on respective capabilities of the device and the initiator device, sending at least one non-discovery beacon to the initiator device, the at least one non-discovery beacon including one or more second messages associated with formation of the peer-to-peer group with the initiator device, and after sending the at least one non-discovery beacon, receiving at least one response from the initiator device, the at least one response including (i) an indication that the initiator device has joined the PBSS and (ii) one or more third messages associated with formation of the peer-to-peer group with the initiator device. The one or more messages may include one or more first messages.

The operations may further include determining that the device is a non-PCP based at least in part on respective capabilities of the device and the initiator device, wherein the PBSS may include computer-executable instructions that configure the at least one processor to perform the operations including monitoring for one or more non-discovery beacons from the initiator device, receiving at least one non-discovery beacon from the initiator device, the at least one non-discovery beacon including one or more second messages associated with formation of the peer-to-peer group with the device, and sending at least one response to the at least one non-discovery beacon, the at least one response including (i) an indication that the device has associated with the PBSS and (ii) one or more third messages associated with formation of the peer-to-peer group with the initiator device.

The operations may further include entering power save mode until the beacon time interval is reached, and waking up from power save mode to receive the one or more messages for forming the peer-to-peer group. The operations may further include determining that the peer-to-peer group has been formed based at least in part on the one or more messages for forming the peer-to-peer group, and determining that the device or the initiator device is a group owner of the peer-to-peer group. The operations may further include receiving a probe request from the initiator device, the probe request including first information associated with the initiator device, sending a probe response to the initiator device, the probe response including second information associated with the device, and determining a PCP for creating the PBSS, the determination of the PCP based at least in part on the first information and the second information.

In example embodiments of the disclosure, there is disclosed an apparatus. The apparatus may include means for receiving respective information associated with one or more candidate devices, the respective information including a respective unique identifier of the candidate devices and a direction of the one or more candidate devices. The apparatus may include means for determining a target device of the one or more candidate devices with which to engage to establish a personal basic service set (PBSS) to facilitate formation of a peer-to-peer group including the device and the target device. The apparatus may include means for beamforming in the direction of the target device. The apparatus may include means for sending a unicast beacon to the target device based at least in part on the beamforming, wherein an association beamforming training (ABFT) responder field of the unicast beacon includes the respective unique identifier of the target device, wherein the unicast beacon indicates a request that the target device engage the device to establish the PBSS. The apparatus may include means for receiving an acknowledgement from the target device, the acknowledgement including an indication that the target device has engaged with the device to establish the PBSS. The apparatus may include means to establish the PBSS to facilitate formation of the peer-to-peer group.

The apparatus may further include means for sending, at a beacon time interval using the PBSS, one or more messages for forming the peer-to-peer group with the target device. The one or more messages may include one or more first messages, and may further include means for determining that the device is a PBSS control point (PCP) based at least in part on respective capabilities of the device and the target device, wherein establishing the PBSS further includes means for sending at least one non-discovery beacon to the target device, the at least one non-discovery beacon including one or more second messages associated with formation of the peer-to-peer group with the target device, and after sending the at least one non-discovery beacon, means for receiving at least one response from the target device, the at least one response including (i) an indication that the target device has joined the PBSS and (ii) one or more third messages associated with formation of the peer-to-peer group with the device.

The apparatus may further include means for determining that the peer-to-peer group has been formed based at least in part on the one or more messages for forming the peer-to-peer group, and means for determining that the device or the target device is a group owner of the peer-to-peer group. The apparatus may further include means for sending one or more discovery beacons in a plurality of directions to the one or more candidate devices, and in response to sending the one or more discovery beacons, means for receiving one or more respective ABFT responses to the one or more discovery beacons, the one or more ABFT responses including the respective information. The apparatus may further include after receiving the acknowledgement from the target device, means for sending a probe request to the target device, the probe request including first information associated with the device, means for receiving a probe response from the target device, the probe response including second information associated with the target device, and means for determining a PCP for creating the PBSS, the determination of the PCP based at least in part on the first information and the second information. The apparatus may further include at least one radio, at least one memory. The apparatus may further include at least one antenna.

The target device may include a first target device, further including means for determining a time limit for forming the peer-to-peer group, after determining that the time limit has been reached means for disengaging with the target device; and means for determining a second target device of the one or more candidate devices with which to engage to establish the PBSS to facilitate forming the peer-to-peer group. Determining the target device may further include means for receiving a selection of the target device from a user or determine the target device based at least in part on a predetermined configuration.

In example embodiments of the disclosure, there is disclosed one or more computer-readable media including computer-executable instructions that, when executed by one or more processors, configure the one or more processors to perform various operations. The operations may include receiving respective information associated with one or more candidate devices, the respective information including a respective unique identifier of the candidate devices and a direction of the one or more candidate devices. The operations may also include determining a target device of the one or more candidate devices with which to engage to establish a personal basic service set (PBSS) to facilitate formation of a peer-to-peer group including the device and the target device. The operations may further include beamforming in the direction of the target device. The operations may further include sending a unicast beacon to the target device based at least in part on the beamforming, wherein an association beamforming training (ABFT) responder field of the unicast beacon includes the respective unique identifier of the target device, wherein the unicast beacon indicates a request that the target device engage the device to establish the PBSS.

The operations may further include receiving an acknowledgement from the target device, the acknowledgement including an indication that the target device has engaged with the device to establish the PBSS. The operations may include establishing the PBSS to facilitate formation of the peer-to-peer group. The operations may include sending, at a beacon time interval using the PBSS, one or more messages for forming the peer-to-peer group with the target device. The one or more messages may include one or more first messages, and wherein the method further includes determining that the device is a PBSS control point (PCP) based at least in part on respective capabilities of the device and the target device, wherein establishing the PBSS, the method may further include sending at least one non-discovery beacon to the target device, the at least one non-discovery beacon including one or more second messages associated with formation of the peer-to-peer group with the target device, after sending the at least one non-discovery beacon, receiving at least one response from the target device, the at least one response including (i) an indication that the target device has joined the PBSS and (ii) one or more third messages associated with formation of the peer-to-peer group with the device.

The operations may further include determining that the peer-to-peer group has been formed based at least in part on the one or more messages for forming the peer-to-peer group, and determining that the device or the target device is a group owner of the peer-to-peer group. The operations may further include sending one or more discovery beacons in a plurality of directions to the one or more candidate devices, and in response to sending the one or more discovery beacons, receiving one or more respective ABFT responses to the one or more discovery beacons, the one or more ABFT responses including the respective information. The operations may further include, after receiving the acknowledgement from the target device, sending a probe request to the target device, the probe request including first information associated with the device, receiving a probe response from the target device, the probe response including second information associated with the target device, and determining a PCP for creating the PBSS, the determination of the PCP based at least in part on the first information and the second information.

The operations may further include at least one radio, and at least one memory. The operations may further include at least one antenna. The target device may include a first target device, wherein the operations may further include determining a time limit for forming the peer-to-peer group. After determining that the time limit has been reached, the operations may further include disengaging with the target device, and determining a second target device of the one or more candidate devices with which to engage to establish the PBSS to facilitate forming the peer-to-peer group. Wherein determining the target device, the operations may further include receiving a selection of the target device from a user or determine the target device based at least in part on a predetermined configuration.

In example embodiments of the disclosure, there is disclosed an apparatus. The apparatus may include means for receiving, from an initiator device, a discovery beacon including a first unique identification of the initiator device and a first direction of the initiator device. The apparatus may also include means for beamforming in the first direction of the initiator device. The apparatus may include means for sending an association beamforming training (ABFT) response to the initiator device, the ABFT response including (i) a Media Access Control (MAC) address of a device including the at least one processor and (ii) a second direction of the device. The apparatus may include means for receiving a unicast beacon from the initiator device, the unicast beacon including the MAC address of the device in an ABFT responder field of the unicast beacon and an indication that the initiator device requests engagement with the device to establish a personal basic service set (PBSS) to facilitate formation of a peer-to-peer group including the device and the initiator device.

The apparatus may also include means for associating with the PBSS based at least in part on the unicast beacon. The apparatus may include means for sending, at a beacon time interval using the PBSS, one or more messages for forming the peer-to-peer group with the initiator device. The apparatus may further include means for sending an acknowledgement to the initiator device that the device has associated with the PBSS. The apparatus may further include means for determining that the device is a PCP based at least in part on respective capabilities of the device and the initiator device, means for sending at least one non-discovery beacon to the initiator device, the at least one non-discovery beacon including one or more second messages associated with formation of the peer-to-peer group with the initiator device, and after sending the at least one non-discovery beacon, means for receiving at least one response from the initiator device, the at least one response including (i) an indication that the initiator device has joined the PBSS and (ii) one or more third messages associated with formation of the peer-to-peer group with the initiator device.

The one or more messages may include one or more first messages. The receiver apparatus may further include means for determining that the device is a non-PCP based at least in part on respective capabilities of the device and the initiator device, wherein associating with the PBSS further includes means for monitoring for one or more non-discovery beacons from the initiator device, means for receiving at least one non-discovery beacon from the initiator device, the at least one non-discovery beacon including one or more second messages associated with formation of the peer-to-peer group with the device, and means for sending at least one response to the at least one non-discovery beacon, the at least one response including (i) an indication that the device has associated with the PBSS and (ii) one or more third messages associated with formation of the peer-to-peer group with the initiator device.

The apparatus may further include means for entering power save mode until the beacon time interval is reached, and means for waking up from power save mode to receive the one or more messages for forming the peer-to-peer group. The apparatus may further include means for determining that the peer-to-peer group has been formed based at least in part on the one or more messages for forming the peer-to-peer group, and means for determining that the device or the initiator device is a group owner of the peer-to-peer group. The apparatus may further include means for receiving a probe request from the initiator device, the probe request including first information associated with the initiator device, means for sending a probe response to the initiator device, the probe response including second information associated with the device, and means for determining a PCP for creating the PBSS, the determination of the PCP based at least in part on the first information and the second information.

In example embodiments of the disclosure, there is disclosed a method. The method may include receiving, from an initiator device, a discovery beacon including a first unique identification of the initiator device and a first direction of the initiator device. The method may include beamforming in the first direction of the initiator device. The method may include sending an association beamforming training (ABFT) response to the initiator device, the ABFT response including (i) a Media Access Control (MAC) address of a device including the at least one processor and (ii) a second direction of the device. The method may include receiving a unicast beacon from the initiator device, the unicast beacon including the MAC address of the device in an ABFT responder field of the unicast beacon and an indication that the initiator device requests engagement with the device to establish a personal basic service set (PBSS) to facilitate formation of a peer-to-peer group including the device and the initiator device.

The method may further include associating with the PBSS based at least in part on the unicast beacon. The method may include sending, at a beacon time interval using the PBSS, one or more messages for forming the peer-to-peer group with the initiator device. The method may further include sending an acknowledgement to the initiator device that the device has associated with the PBSS. The method may further include determining that the device is a PCP based at least in part on respective capabilities of the device and the initiator device, sending at least one non-discovery beacon to the initiator device, the at least one non-discovery beacon including one or more second messages associated with formation of the peer-to-peer group with the initiator device, and after sending the at least one non-discovery beacon, receiving at least one response from the initiator device, the at least one response including (i) an indication that the initiator device has joined the PBSS and (ii) one or more third messages associated with formation of the peer-to-peer group with the initiator device.

The one or more messages may include one or more first messages. The method may further include determining that the device is a non-PCP based at least in part on respective capabilities of the device and the initiator device. Associating with the PBSS may further include monitoring for one or more non-discovery beacons from the initiator device, receiving at least one non-discovery beacon from the initiator device, the at least one non-discovery beacon including one or more second messages associated with formation of the peer-to-peer group with the device, and sending at least one response to the at least one non-discovery beacon, the at least one response including (i) an indication that the device has associated with the PBSS and (ii) one or more third messages associated with formation of the peer-to-peer group with the initiator device.

The method may further include entering power save mode until the beacon time interval is reached, and waking up from power save mode to receive the one or more messages for forming the peer-to-peer group. The method may further include determining that the peer-to-peer group has been formed based at least in part on the one or more messages for forming the peer-to-peer group, determining that the device or the initiator device is a group owner of the peer-to-peer group. The method may further include receiving a probe request from the initiator device, the probe request including first information associated with the initiator device, sending a probe response to the initiator device, the probe response including second information associated with the device, and determining a PCP for creating the PBSS, the determination of the PCP based at least in part on the first information and the second information.

What is claimed is:

1. A device comprising:
   a modulator;
   a demodulator;
   at least one processor, wherein the at least one processor is configured to:
      receive, during a first discovery, respective information about one or more candidate devices, the respective information comprising a respective identifier of the candidate devices, a direction of the one or more candidate devices, and a respective capability information of the one or more candidate devices;
      determine a target device of the one or more candidate devices identified during the first discovery with which to engage to establish a personal basic service set (PBSS) based on the respective information of the one or more candidate devices, to facilitate formation of a peer-to-peer group comprising the device and the target device;
      beamforming in a direction of the target device;
      send, during a second discovery, a directional unicast beacon to the target device based at least in part on the beamforming, wherein an association beamforming training (ABFT) responder field of the directional unicast beacon comprises the identifier of the target device, wherein the directional unicast beacon indicates a request that the target device engage the device to establish the PBSS;
      receive an acknowledgement from the target device, the acknowledgement comprising an indication that the target device has engaged with the device to establish the PBSS;
      establish the PBSS to facilitate formation of the peer-to-peer group; and
      send, at a beacon time interval using the PBSS, one or more messages for forming the peer-to-peer group with the target device.

2. The device of claim 1, wherein the one or more messages comprise one or more first messages, and wherein the at least one processor is further to:
   determine that the device is a PBSS control point (PCP) based at least in part on respective capabilities of the device and the target device;
   wherein when establishing the PBSS, the at least one processor is further to:
      send at least one non-discovery beacon to the target device, the at least one non-discovery beacon comprising one or more second messages associated with formation of the peer-to-peer group with the target device; and
      after sending the at least one non-discovery beacon, receive at least one response from the target device, the at least one response comprising (i) an indication that the target device has joined the PBSS and (ii) one or more third messages associated with formation of the peer-to-peer group with the device.

3. The device of claim 1, the at least one processor further is to:
   determine that the peer-to-peer group has been formed based at least in part on the one or more messages for forming the peer-to-peer group; and
   determine that the device or the target device is a group owner of the peer-to-peer group.

4. The device of claim 1, the at least one processor further to:
   send one or more discovery beacons in a plurality of directions to the one or more candidate devices; and
   in response to sending the one or more discovery beacons, receive one or more respective ABFT responses to the one or more discovery beacons, the one or more ABFT responses comprising the respective information.

5. The device of claim 1, the at least one processor further to:
   after receiving the acknowledgement from the target device, send a probe request to the target device, the probe request comprising first information associated with the device;
   receive a probe response from the target device, the probe response comprising second information associated with the target device; and
   determine a PCP for creating the PBSS, the determination of the PCP based at least in part on the first information and the second information.

6. The device of claim 1, further comprising:
   at least one radio; and
   at least one memory.

7. The device of claim 6, further comprising:
   at least one antenna.

8. The device of claim 1, wherein the target device comprises a first target device, wherein the at least one processor is further to:
   determine a time limit for forming the peer-to-peer group;
   after determining that the time limit has been reached:
      disengage with the target device; and
      determine a second target device of the one or more candidate devices with which to engage for establishing the PBSS to facilitate forming the peer-to-peer group.

9. The device of claim 1, wherein when determining the target device, the at least one processor is further to:
receive a selection of the target device from a user or determine the target device based at least in part on a predetermined configuration.

10. A method comprising:
receiving, by a first device during a first discovery, respective information about one or more candidate devices, the respective information comprising a respective identifier of the candidate devices, a direction of the one or more candidate devices, and a respective capability information of the one or more candidate devices;
determining, by the first device, a target device of the one or more candidate devices identified during the first discovery with which to engage to establish a personal basic service set (PBSS) based on the respective information of the one or more candidate devices, to facilitate formation of a peer-to-peer group comprising the first device and the target device;
beamforming, by the first device, in a direction of the target device;
sending, by the first device during a second discovery, a directional unicast beacon to the target device based at least in part on the beamforming, wherein an association beamforming training (ABFT) responder field of the directional unicast beacon comprises the identifier of the target device, wherein the directional unicast beacon indicates a request that the target device engage the first device to establish the PBSS;
receiving, by the first device, an acknowledgement from the target device, the acknowledgement comprising an indication that the target device has engaged with the first device to establish the PBSS;
establishing, by the first device, the PBSS to facilitate formation of the peer-to-peer group; and
sending, by the first device, at a beacon time interval using the PBSS, one or more messages for forming the peer-to-peer group with the target device.

11. The method of claim 10, further comprising:
determining, by the first device, that the first device is a PBSS control point (PCP) based at least in part on respective capabilities of the first device and the target device;
wherein establishing the PBSS comprises:
sending at least one non-discovery beacon to the target device, the at least one non-discovery beacon comprising one or more second messages associated with formation of the peer-to-peer group with the target device; and
after sending the at least one non-discovery beacon, receiving at least one response from the target device, the at least one response comprising (i) an indication that the target device has joined the PBSS and (ii) one or more third messages associated with formation of the peer-to-peer group with the first device.

12. The method of claim 10, further comprising:
determining, by the first device, that the peer-to-peer group has been formed based at least in part on the one or more messages for forming the peer-to-peer group; and
determining, by the first device, that the first device or the target device is a group owner of the peer-to-peer group.

13. The method of claim 10, further comprising:
sending, by the first device, one or more discovery beacons in a plurality of directions to the one or more candidate devices; and
in response to sending the one or more discovery beacons, receiving, by the first device, one or more respective ABFT responses to the one or more discovery beacons, the one or more ABFT responses comprising the respective information.

14. The method of claim 10, further comprising:
after receiving the acknowledgement from the target device, sending, by the first device, a probe request to the target device, the probe request comprising first information associated with the first device; and
receiving, by the first device, a probe response from the target device, the probe response comprising second information associated with the target device; and
determining, by the first device, a PCP for creating the PBSS, the determination of the PCP based at least in part on the first information and the second information.

15. The method of claim 10, further comprising:
determining, by the first device, a time limit for forming the peer-to-peer group;
after determining that the time limit has been reached:
disengaging, by the first device, with the target device; and
determining, by the first device, a second target device of the one or more candidate devices with which to engage to establish the PBSS to facilitate forming the peer-to-peer group.

16. The method of claim 10, wherein determining the target device further comprises:
receiving a selection of the target device from a user or determining the target device based at least in part on a predetermined configuration.

17. One or more non-transitory tangible computer-readable media storing computer-executable instructions that, when executed by at least one processor, configure the at least one processor to perform operations comprising:
receiving, from an initiator device during a first discovery, a discovery beacon comprising a first identification of the initiator device, a first direction of the initiator device, and a capability information of the initiator device;
beamforming in the first direction of the initiator device based on the receiving of the discovery beacon;
sending an association beamforming training (ABFT) response to the initiator device, the ABFT response comprising (i) a Media Access Control (MAC) address of a device comprising the at least one processor and (ii) a second direction of the device;
sending capability information of the device to the initiator device;
receiving, during a second discovery, a directional unicast beacon from the initiator device, the directional unicast beacon comprising the MAC address of the device in an ABFT responder field of the directional unicast beacon and an indication that the initiator device requests engagement with the device to establish a personal basic service set (PBSS) to facilitate formation of a peer-to-peer group comprising the device and the initiator device;
associating with the PBSS based at least in part on the directional unicast beacon; and
sending, at a beacon time interval using the PBSS, one or more messages for forming the peer-to-peer group with the initiator device.

18. The one or more non-transitory tangible computer-readable media of claim 17, the at least one processor further configured to perform the operation comprising sending an acknowledgement to the initiator device that the device has associated with the PBSS.

19. The one or more non-transitory tangible computer-readable media of claim 17, the at least one processor further configured to perform the operations comprising:
   determining that the device is a PCP based at least in part on respective capabilities of the device and the initiator device;
   sending at least one non-discovery beacon to the initiator device, the at least one non-discovery beacon comprising one or more second messages associated with formation of the peer-to-peer group with the initiator device; and
   after sending the at least one non-discovery beacon, receiving at least one response from the initiator device, the at least one response comprising (i) an indication that the initiator device has joined the PBSS and (ii) one or more third messages associated with formation of the peer-to-peer group with the initiator device.

20. The one or more non-transitory tangible computer-readable media of claim 17, wherein the one or more messages comprise one or more first messages, and wherein the at least one processor is further configured to perform the operations comprising:
   determining that the device is a non-PCP based at least in part on respective capabilities of the device and the initiator device;
   wherein the computer-executable instructions for associating with the PBSS comprise computer-executable instructions that configure the at least one processor to perform the operations comprising:
      monitoring for one or more non-discovery beacons from the initiator device;
      receiving at least one non-discovery beacon from the initiator device, the at least one non-discovery beacon comprising one or more second messages associated with formation of the peer-to-peer group with the device; and
      sending at least one response to the at least one non-discovery beacon, the at least one response comprising (i) an indication that the device has associated with the PBSS and (ii) one or more third messages associated with formation of the peer-to-peer group with the initiator device.

21. The one or more non-transitory tangible computer-readable media of claim 17, the at least one processor further configured to perform the operations comprising:
   entering power save mode until the beacon time interval is reached; and
   waking up from power save mode to receive the one or more messages for forming the peer-to-peer group.

22. The one or more non-transitory tangible computer-readable media of claim 17, the at least one processor further configured to perform the operations comprising:
   determining that the peer-to-peer group has been formed based at least in part on the one or more messages for forming the peer-to-peer group; and
   determining that the device or the initiator device is a group owner of the peer-to-peer group.

23. The one or more non-transitory tangible computer-readable media of claim 17, the at least one processor further configured to perform the operations comprising:
   receiving a probe request from the initiator device, the probe request comprising first information associated with the initiator device;
   sending a probe response to the initiator device, the probe response comprising second information associated with the device; and
   determining a PCP for creating the PBSS, the determination of the PCP based at least in part on the first information and the second information.

* * * * *